US009746846B1

(12) United States Patent
Truscott (10) Patent No.: US 9,746,846 B1
(45) Date of Patent: Aug. 29, 2017

(54) AUTOMATED LOADING BRIDGE POSITIONING USING ENCODED DECALS (71) Applicant: Accenture Global Solutions Limited, Dublin (IE)

(72) Inventor: Andrew J. Truscott, Spring, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/260,887

(22) Filed: Sep. 9, 2016

(51) Int. Cl.
G05B 19/042 (2006.01)
G05B 19/29 (2006.01)
G05B 19/12 (2006.01)

(52) U.S. Cl.
CPC ......... G05B 19/124 (2013.01); G05B 19/042 (2013.01); G05B 19/29 (2013.01); G05B 2219/40538 (2013.01)

(58) Field of Classification Search
CPC .... G05B 19/124; G05B 19/042; G05B 19/29; G05B 2219/40538
USPC .......................................................... 700/275
See application file for complete search history.

(56) References Cited

U.S. PATENT DOCUMENTS 3,683,440 A  8/1972 Xenakis et al.
7,458,122 B2 12/2008 Hutton
8,879,822 B2 11/2014 Matsumoto
9,066,737 B2  6/2015 Bärwinkel et al.
2005/0198750 A1* 9/2005 Spencer .................. B64F 1/002
14/71.5

OTHER PUBLICATIONS

Aero News Network, "Passenger Bridge on Auto, Mr. Sulu," http://www.aero-news.net/index.cfm?do=main.textpost&id=ce1db870-5cb7-4606-b6bc-c9681b10d2f6, Aug. 27, 2004, 3 pages.
Sick Sensor Intelligence, "Passenger boarding bridge and aircraft docking system," https://www.sick.com/gb/en/industries/airport/aircraft-handling-at-the-terminal/passenger-boarding-bridge-and-aircraft-docking-system/c/g357295, Feb. 1, 2015, 2 pages.
Wikipedia, "Jet Bridge," https://en.wikipedia.org/wiki/Jet_bridge, Jul. 30, 2016, 7 pages.

* cited by examiner

Primary Examiner — Robert Fennema
Assistant Examiner — Jigneshkumar Patel
(74) Attorney, Agent, or Firm — Harrity & Harrity, LLP (57) ABSTRACT A device may obtain, from one or more cameras, an image that depicts one or more encoded decals positioned on a body of a vehicle. The device may process the image and may identify, based on processing the image, one or more characteristics of the one or more encoded decals. The device may determine, based on the one or more characteristics of the one or more encoded decals, positioning information to be used to position a loading bridge relative to the body of the vehicle. The device may determine one or more control signals based on the positioning information. The device may provide the one or more control signals to one or more actuators to automatically position the loading bridge relative to the body of the vehicle.

20 Claims, 11 Drawing Sheets

AUTOMATED LOADING BRIDGE POSITIONING USING ENCODED DECALS

BACKGROUND

A loading bridge is a movable connector that extends from a loading gate to a door on a vehicle. The loading bridge allows passengers or other objects (e.g., cargo) to be boarded or removed from the vehicle. For example, a jet bridge is an example of a loading bridge used to convey passengers from an airport terminal gate to an aircraft, and a gangway is an example of a loading bridge used to convey passengers from a dockside terminal to a cruise ship. The loading bridge may permit loading and unloading without having to go outdoors and without having to ascend or descend stairs to enter or exit the vehicle.

SUMMARY

According to some possible implementations, a device may obtain, from one or more cameras, an image that depicts one or more encoded decals positioned on a body of a vehicle. The device may process the image and may identify, based on processing the image, one or more characteristics of the one or more encoded decals. The device may determine, based on the one or more characteristics of the one or more encoded decals, positioning information to be used to position a loading bridge relative to the body of the vehicle. The device may determine one or more control signals based on the positioning information. The device may provide the one or more control signals to one or more actuators to automatically position the loading bridge relative to the body of the vehicle.

According to some possible implementations, a method may include receiving, by a device, one or more images that depict one or more encoded decals positioned on a surface. The method may include processing, by the device, the one or more images. The method may include identifying, by the device and based on processing the one or more images, one or more characteristics of the one or more encoded decals. The method may include determining, by the device and based on the one or more characteristics of the one or more encoded decals, positioning information to be used to position a movable object relative to the surface. The method may include determining, by the device, one or more control signals based on the positioning information. The method may include providing, by the device, the one or more control signals to one or more actuators to automatically position the movable object relative to the surface.

According to some possible implementations, a non-transitory computer-readable medium may store one or more instructions that, when executed by one or more processors, cause the one or more processors to identify one or more encoded decals included in an image. The one or more encoded decals may be positioned on a surface. The one or more instructions may cause the one or more processors to identify one or more characteristics of the one or more encoded decals. The one or more instructions may cause the one or more processors to determine, based on the one or more characteristics of the one or more encoded decals, positioning information to be used to position a movable object relative to the surface. The one or more instructions may cause the one or more processors to determine one or more control signals, to be provided to one or more actuators, based on the positioning information. The one or more instructions may cause the one or more processors to provide the one or more control signals to the one or more actuators to position the movable object relative to the surface.

DETAILED DESCRIPTION

The following detailed description of example implementations refers to the accompanying drawings. The same reference numbers in different drawings may identify the same or similar elements.

A loading bridge (e.g., a jet bridge) is a movable object that extends to connect to a vehicle, such as an aircraft (e.g., an airplane), a ship, a boat, or another vehicle, so as to allow passengers or objects to enter or exit the vehicle, such as via a door or other entryway on the vehicle. The loading bridge may provide such passengers or objects with access to or from the vehicle that is safe, secure, and protected from outdoor elements.

Different vehicles may have doors in different locations, at different heights, at different positions, of different dimensions, or the like. Furthermore, different vehicles may have bodies of different shapes or curvatures. For these reasons, it may be difficult to consistently position or align a loading bridge with a door of a vehicle, potentially causing damage to the vehicle, causing damage to the loading bridge, and/or introducing delay in loading or unloading the vehicle.

Implementations described herein provide a way to automatically align a loading bridge with a door of a vehicle. A processing device obtains images, captured by a camera, of encoded decals on the vehicle. The processing device analyzes the images to determine characteristics of the encoded decals and determines positioning information based upon those characteristics. Based on the positioning information, the processing device provides control signals to move the loading bridge and align the loading bridge with the vehicle. In this way, the possibility and/or frequency of alignment errors is reduced, thereby reducing the risk of damage to the loading bridge or to the vehicle, reducing risk of injury to passengers and air carrier employees, and/or reducing delays associated with loading or unloading the vehicle.

Figure 1A:
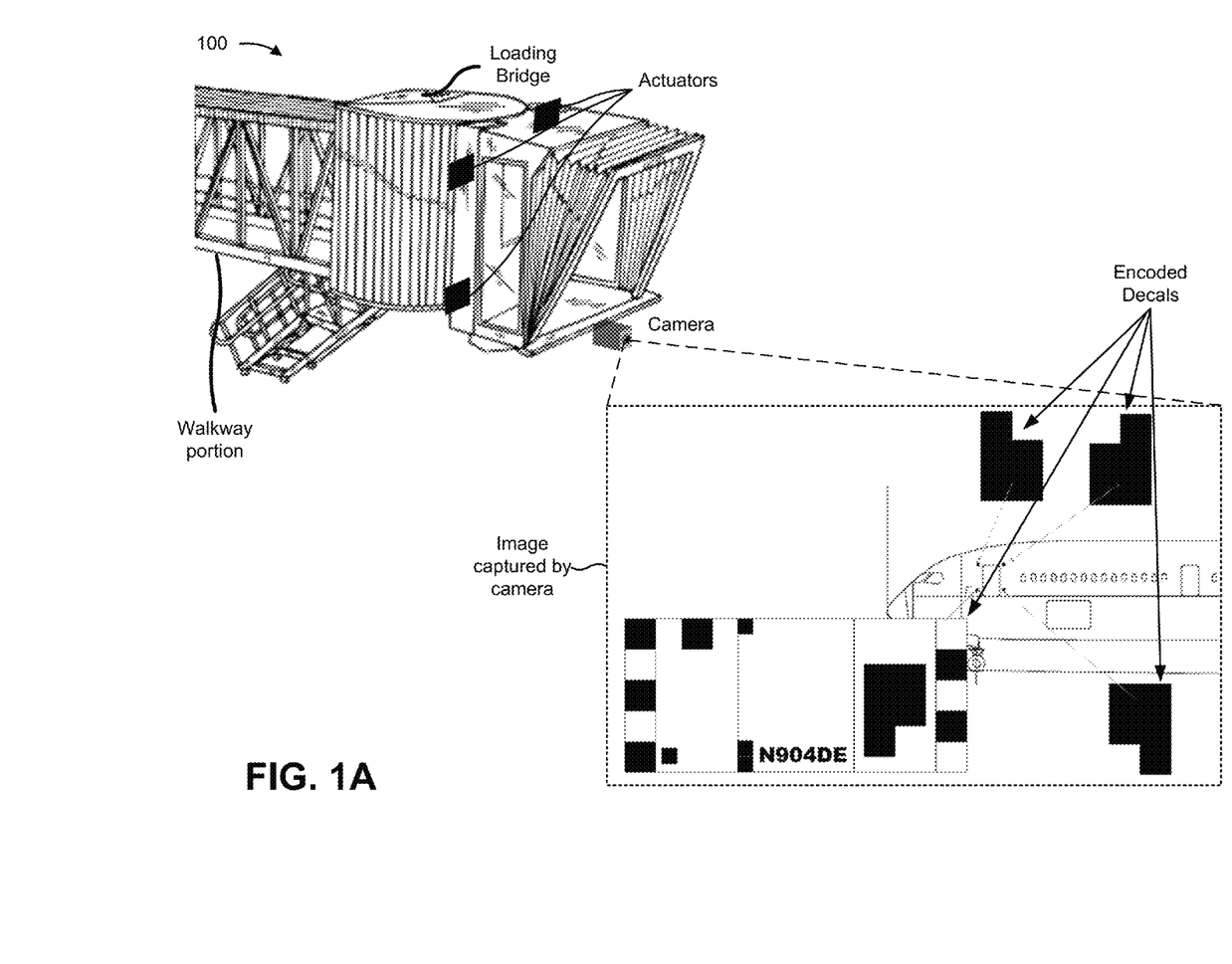
FIGS. 1A and 1B are diagrams of an overview of an example implementation described herein.
Figure 1B:
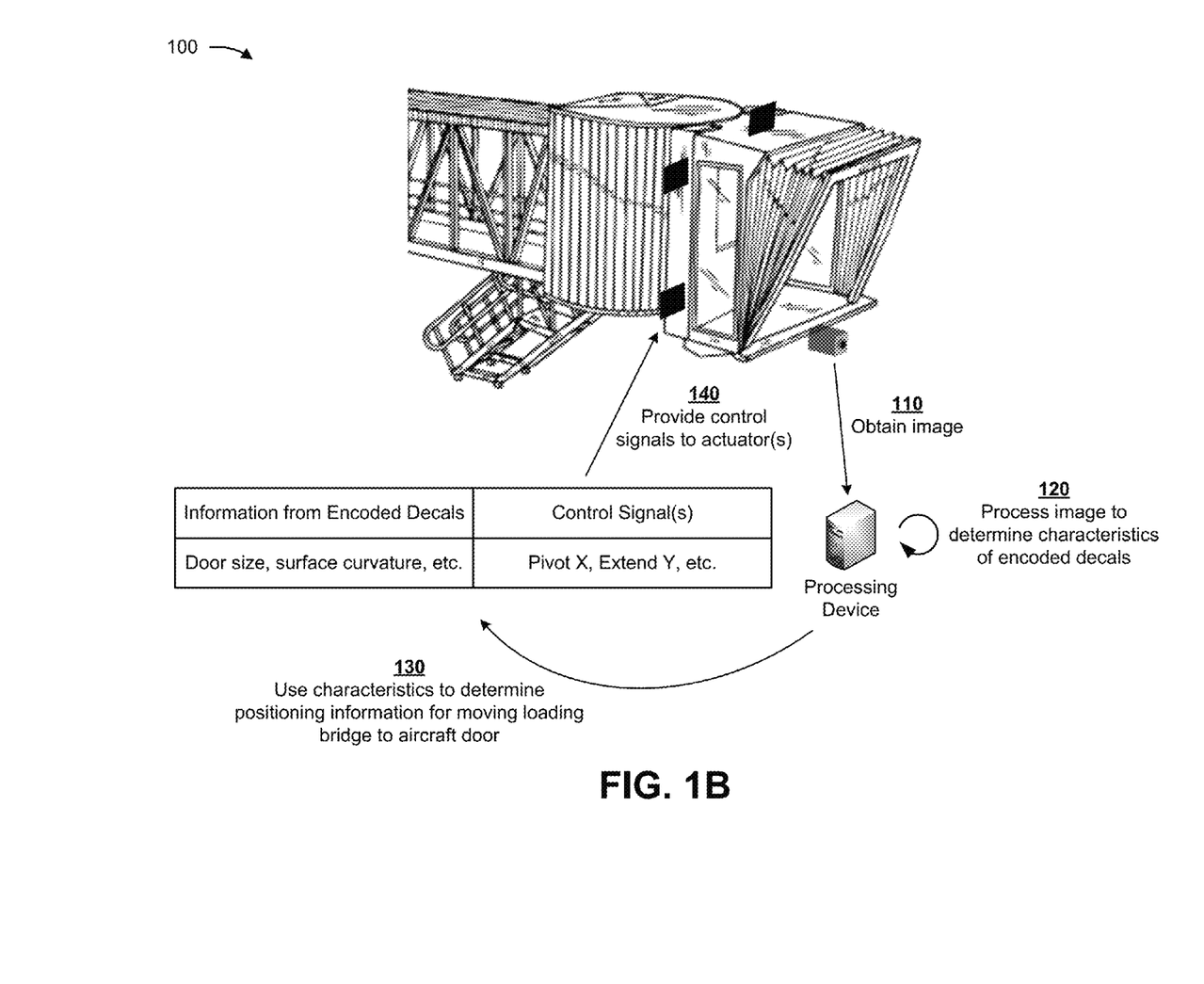

FIGS. 1A and 1B are diagrams of an overview of an example implementation 100 described herein. As shown in FIG. 1A, example implementation 100 may include a loading bridge that includes one or more actuators (e.g., servo controlled motors), for moving the loading bridge, and a camera (or cameras) that may capture an image that includes encoded decals on a vehicle, such as an airplane. Additional actuators (not shown) may also be used to position and/or support a walkway portion associated with the loading bridge. As shown in FIG. 1B, and by reference number 110, a processing device may obtain a series of images from the camera that depicts one or more encoded decals positioned on a surface. For example, the processing device may obtain an image such as the image shown in FIG. 1A, which depicts encoded decals positioned at the corners of a door on an aircraft.

As shown by reference number 120, the processing device may process the image to determine one or more characteristics (e.g., a shape, a size, a color, a position, etc.) of the one or more encoded decals. As shown by reference number 130, the processing device may use the characteristics to determine positioning information for moving the loading bridge to the aircraft door. For example, the processing device may determine decal information (e.g., door size, surface curvature, etc.) based on the characteristics of the encoded decals, and may determine, based on the decal information, positioning information indicating control signals (e.g., pivot X, extend Y, etc.) to move the loading bridge to the aircraft door. The encoded decals may contain discrete information which can be relied upon by the processing device, or reference information which can be verified by the processing device, as described elsewhere herein.

As shown by reference number 140, the processing device may provide one or more control signals, as indicated by the positioning information, to the actuators in order to automatically position the loading bridge relative to the vehicle. In this way, the possibility and/or frequency of alignment errors is reduced, thereby reducing the risk of damage to the loading bridge or to the vehicle, and/or reducing delays associated with loading or unloading the vehicle.

As indicated above, FIGS. 1A and 1B are provided merely as an example. Other examples are possible and may differ from what was described in connection with FIGS. 1A and 1B.

Figure 2:
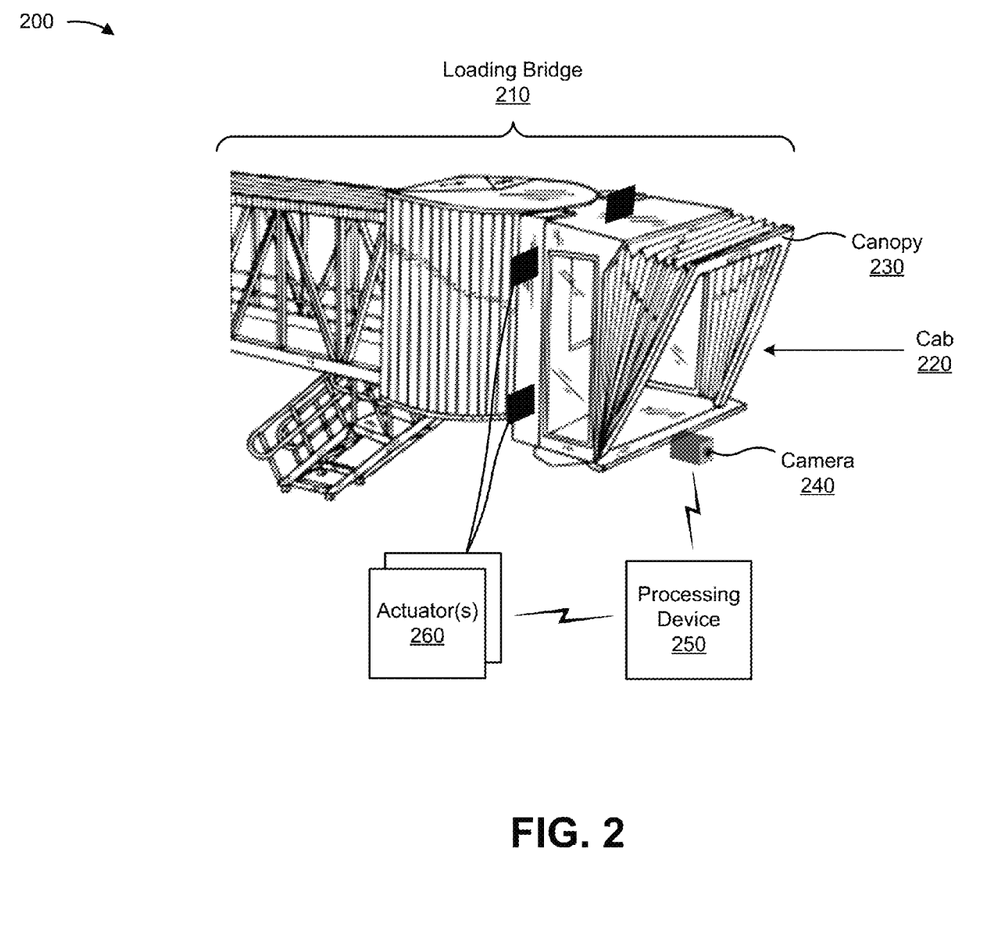
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a loading bridge 210, a cab 220, a canopy 230, a camera 240, a processing device 250, and one or more actuators 260. Devices of environment 200 may interconnect via wired connections, wireless connections, or a combination of wired and wireless connections.

Loading bridge 210 includes one or more devices capable of connecting to a vehicle. For example, loading bridge 210 may include a movable object that connects to an airplane, a boat, a truck, or another type of vehicle. In some implementations, loading bridge 210 may provide for loading or unloading of passengers (e.g., humans, animals, etc.) or objects (e.g., luggage, cargo, smaller vehicles, etc.). While some implementations may be described herein in the context of a loading bridge that connects to a surface of a vehicle, some implementations may apply to other types of movable objects, which may be designed to connect to any surface.

Cab 220 includes a portion of loading bridge 210, such as a portion at the end of loading bridge 210 that connects to a vehicle. For example, cab 220 may be provided at the end of loading bridge 210 and may be raised or lowered, may be extended or retracted, and/or may pivot, to accommodate vehicles of different heights, sizes, or the like. Cab 220 may include an operator's station from which an operator may control the motion of cab 220.

Canopy 230 includes a portion of loading bridge 210 that may extend to the vehicle. For example, canopy 230 may include an accordion-like canopy that allows the bridge to dock with vehicles of differing shapes and sizes, and may provide a nearly weather-proof seal.

Camera 240 includes one or more devices capable of capturing images, such as one or more still images or a sequence of images that form a video. For example, camera 240 may include a still camera (e.g., a digital camera), a video camera (e.g., a digital video camera), or the like. In some implementations, camera 240 may be movable and/or may include a movable lens, and camera 240 and/or the lens may move (e.g., orient, zoom, or focus) automatically based on internal functionality (e.g., for identification, tracking, etc.) and/or instructions from another device (e.g., processing device 250). Camera 240 can be configured for day or night operations using, for example, infrared image capture components. Camera 240 may also include distance and/or motion sensing components, such as laser range finders, passive infrared motion detectors, etc. In some implementations, camera 240 may include multiple cameras, which may communicate directly with processing device 250 or indirectly with processing device 250 (e.g., via an imaging aggregator).

In some implementations, camera 240 may be incorporated into processing device 250 (e.g., via built-in hardware). In some implementations, camera 240 may be separate from processing device 250, and may communicate with processing device 250 to provide images and/or other information to processing device 250 and/or to obtain instructions and/or other information from processing device 250. In this case, camera 240 may communicate with processing device 250 via a wired connection (e.g., a universal serial bus (USB) connection, an Ethernet connection, etc.) and/or a wireless connection (e.g., a Wi-Fi connection, a near field communication (NFC) connection, etc.).

Processing device 250 includes one or more devices capable of processing images. For example, processing device 250 may include a computing device, such as a desktop computer, a laptop computer, a server, or the like. In some implementations, processing device 250 may process one or more images captured by camera 240. Based on processing the images, processing device 250 may provide one or more control signals to one or more actuators 260 to position loading bridge 210 (e.g., cab 220 of loading bridge 210) relative to a vehicle. In some implementations, processing device 250 may provide information to camera 240 indicating adjustments to orientation, zoom, focus, or the like, to capture additional images, to improve clarity of images, or the like.

Actuator 260 includes one or more devices capable of moving or controlling loading bridge 210. For example, actuator 260 may include a hydraulic actuator, a pneumatic actuator, an electric actuator, a servomechanism, or the like. In some implementations, actuator 260 may receive one or more control signals from processing device 250, and may perform a mechanical action based on the control signal(s). For example, actuator 260 may perform a mechanical action to raise, lower, extend, retract, or pivot loading bridge 210.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
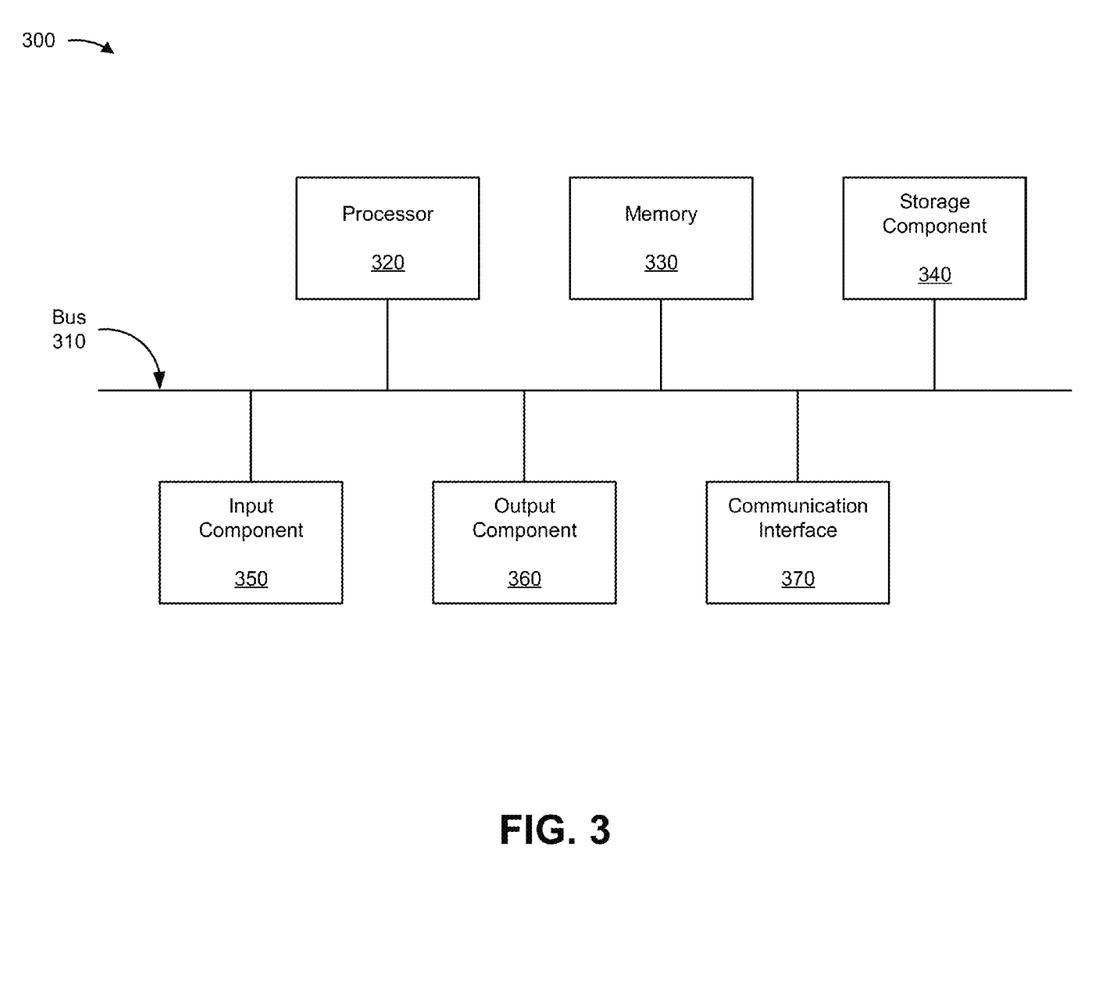
FIG. 3 is a diagram of example components of one or more devices of FIG. 2.

FIG. 3 is a diagram of example components of a device 300. Device 300 may correspond to camera 240, processing device 250, and/or actuator 260. In some implementations, camera 240, processing device 250, and/or actuator 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
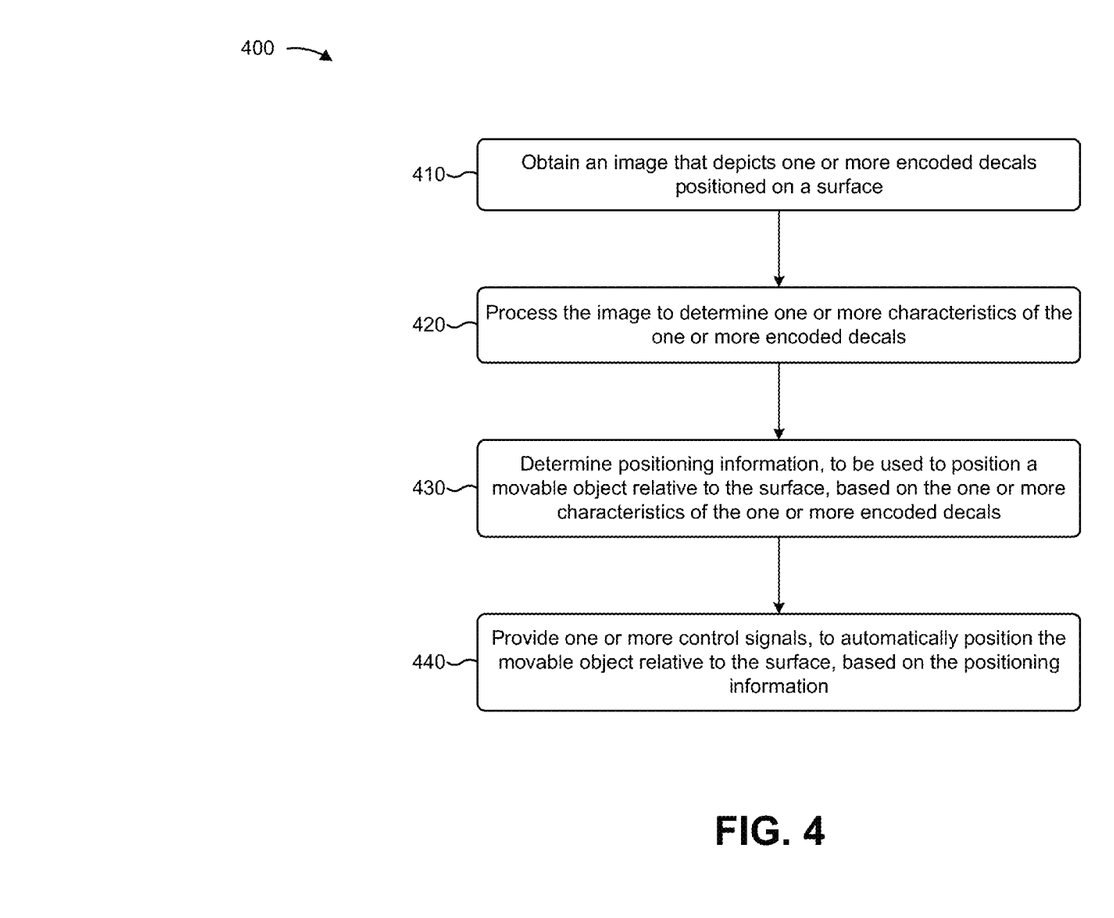
FIG. 4 is a flow chart of an example process for automated positioning using encoded decals.

FIG. 4 is a flow chart of an example process 400 for automated positioning using encoded decals. In some implementations, one or more process blocks of FIG. 4 may be performed by processing device 250. In some implementations, one or more process blocks of FIG. 4 may be performed by another device or a group of devices separate from or including processing device 250, such as camera 240 and/or actuator 260.

As shown in FIG. 4, process 400 may include obtaining an image that depicts one or more encoded decals positioned on a surface (block 410). For example, processing device 250 may obtain, from camera 240, an image that depicts one or more encoded decals positioned on a surface. In some implementations, the surface may be a body of a vehicle, and the encoded decals may be affixed to the body of the vehicle.

In some implementations, the encoded decals may be positioned or affixed to the surface relative to a target area of the surface. For example, the encoded decals may be positioned on the target area, above the target area, below the target area, to the left of the target area, to the right of the target area, at multiple locations near or around the target area (e.g., on each side of the target area, in the corners of the target area, etc.), or the like. In some implementations, the target area may include a door, an opening, a location where passengers or cargo enter or exit a vehicle, a location where material is to be deposited or removed, or the like. In some implementations, the target area may be a target for automatically moving a movable object (e.g., loading bridge 210) relative to the surface, as described below.

Any number of encoded decals may be positioned on the surface and/or depicted in the image. For example, the encoded decals may include a single encoded decal (e.g., positioned in the center of the target area). As another example, the encoded decals may include two encoded decals (e.g., positioned on opposite sides of the target area). As other examples, the encoded decals may include three encoded decals, four encoded decals (e.g., positioned on all sides of the target area, positioned at the corners of the target area, etc.), or more encoded decals. As a particular example, FIGS. 5A and 5B each show four encoded decals positioned at the corners of a door on an aircraft.

In some implementations, processing device 250 may periodically receive still images and/or may receive a video stream of a sequence of images (e.g., from camera 240). In this case, processing device 250 may process an image to determine whether encoded decals are depicted in the image. If encoded decals are not depicted, processing device 250 may discard the image to conserve processing resources and memory resources. If encoded decals are depicted, processing device 250 may process the image to determine positioning information, as described below. In the event that no encoded decals are depicted, processing device 250 may command the camera (or cameras) 240 to search a larger area to discover encoded decals (e.g., by zooming out).

In some implementations, one or more of the encoded decals may indicate an encoded area, on the surface, where the encoded decals are located. For example, an encoded decal may indicate a margin or border of an encoded area. As a particular example, as shown in FIGS. 6A-6D, an encoded area may be bounded by a shape pattern indicating a left margin and a shape pattern indicating a right margin. In this case, processing device 250 may interpret the information between the left margin and the right margin as including one or more patterns or shapes to represent particular types of information based on their position within the encoded area. For example, based on identifying the left and right margin, processing device 250 may identify a lower central portion, of an area between the left and right margin, as indicating registration information, as shown in FIGS. 6A-6D.

Figure 5A:
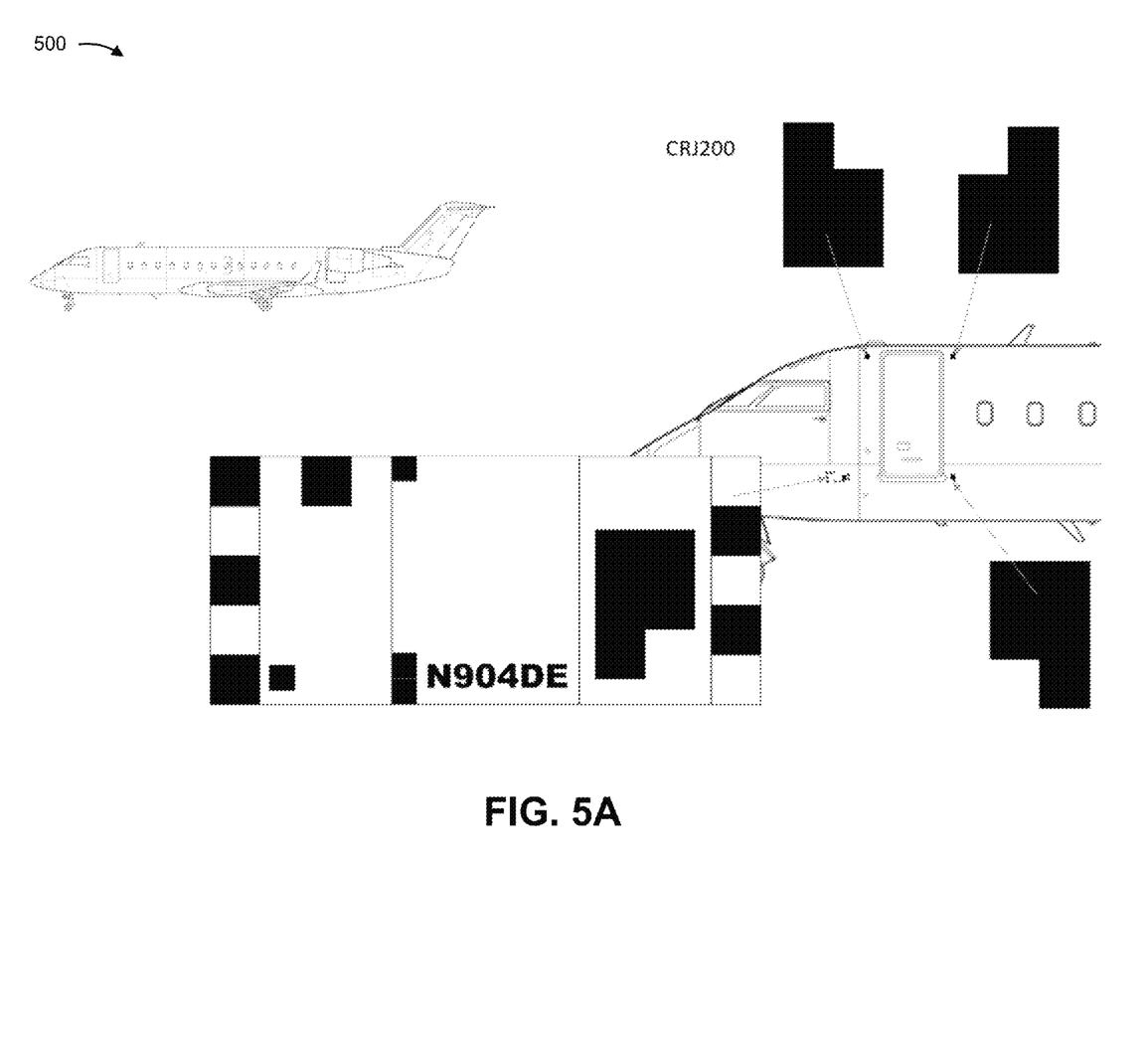
FIGS. 5A and 5B are diagrams of an example implementation relating to the example process shown in FIG. 4.
Figure 5B:
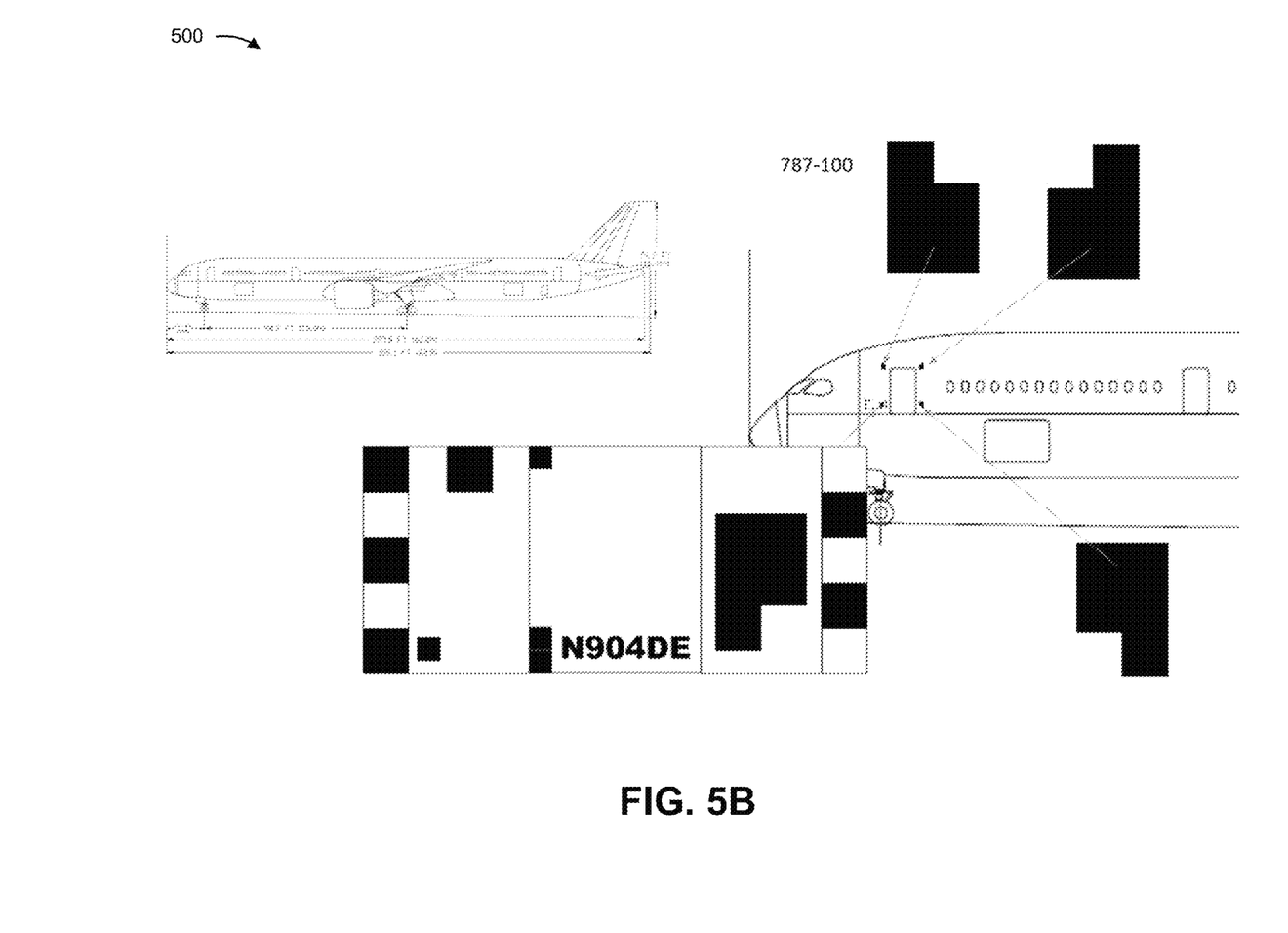

Additionally, or alternatively, an encoded decal may indicate a decal location (e.g., a position of an encoded decal relative to other encoded decals), or the like. For example, the encoded decal at each door corner may include a different shape that is unique to the corner in which the encoded decal is located. As a particular example, as shown in FIGS. 5A-5B, the shape may include a larger block and a smaller block, with the location of the smaller block relative to the larger block (e.g., above left, above right, below left, below right) indicating the location of the encoded decal relative to the door. In some implementations, processing device 250 may use the decal location information to determine whether to further process the image (e.g., to determine whether all encoded decals are depicted, or have been depicted).

As further shown in FIG. 4, process 400 may include processing the image to determine one or more characteristics of the one or more encoded decals (block 420). For example, processing device 250 may analyze the image to determine one of more characteristic(s) of the encoded decal(s) depicted in the image. A characteristic of the encoded decals may include a shape, an orientation, a color of an encoded decal, or the like. As another example, a characteristic of the encoded decals may include a size of an encoded decal (e.g., relative to sizes of one or more other encoded decals). As yet another example, a characteristic of the encoded decals may include a position of an encoded decal relative to one or more other encoded decals, or relative to one or more surface features of the surface. As still another example, a characteristic of the encoded decals may include a quantity of the encoded decals. As another example, a characteristic of the encoded decals may include a pattern formed by multiple encoded decals (e.g., based on position, shape, orientation, color, size, etc.). As another example, an encoded decal may include human readable characters or other symbols which can be decoded by processing device 250.

Although characteristics are described with reference to particular attributes above, in some implementations, processing device 250 may analyze the image to determine characteristics corresponding to other attributes of the encoded decals, and/or may determine characteristics corresponding to any number and combination of attributes. Additionally, or alternatively, processing device 250 may analyze the image to determine one or more characteristics of the surface. For example, processing device 250 may determine an outline of a door based on different colors, contrast, shadows, or the like.

As shown in FIG. 4, process 400 may include determining positioning information, to be used to position a movable object relative to the surface, based on the one or more characteristics of the one or more encoded decals (block 430). For example, processing device 250 may determine positioning information based on the one or more characteristics of the one or more encoded decals depicted in an image. In some implementations, positioning information may be used by processing device 250 to determine one or more control signals to be provided to one or more actuators 260 to control a position of a movable object (e.g., loading bridge 210) relative to a surface (e.g., a body of an airplane or another vehicle). For example, positioning information may indicate which actuators 260 are to be provided with control signals, a strength of a control signal, a sequence in which control signals are to be provided (e.g., a sequence for a single actuator 260, or a sequence for multiple actuators 260), a duration of time during which a control signal is to be provided, a type of control signal (e.g., to cause the movable object to be extended, retracted, raised, lowered, pivoted in a particular direction, etc.), or the like.

In some implementations, processing device 250 may determine positioning information based on decal information that is obtained based on processing one or more images. For example, processing device 250 may store decal information in a data structure, and may use the decal information to determine the positioning information (e.g., based on a correspondence in the data structure). The decal information may include information regarding an encoded decal, a surface, and/or a vehicle. For example, the decal information may include information regarding a vehicle to which the encoded decals are affixed.

In some implementations, the decal information may indicate a size or dimensions of the target area (e.g., a size of a door, or dimensions of a door), a size of one or more encoded decals, a curvature of the surface (e.g., a curvature of an airplane body), a manufacturer and/or model of the vehicle, a location of the target area on the vehicle (e.g., a forward door on an aircraft, a rear door of an aircraft, a cargo door of an aircraft, etc.), a location of an encoded decal relative to the target area and/or relative to other encoded decals, vehicle identification information associated with a particular vehicle (e.g., a vehicle identifier, such as a vehicle registration number, a vehicle serial number, a vehicle identification number, etc.), or the like.

Figure 6A:
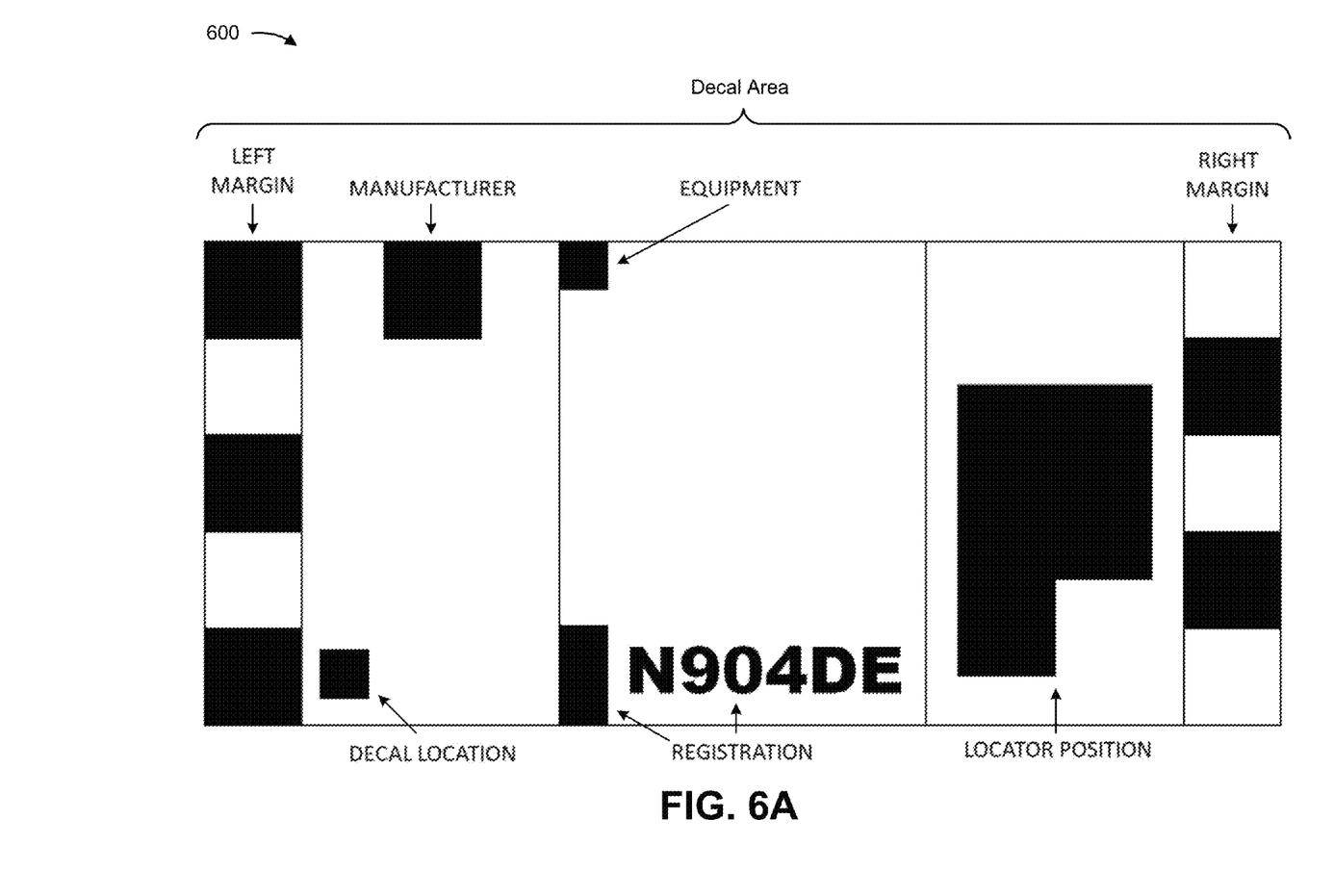
FIGS. 6A-6D are diagrams of another example implementation relating to the example process shown in FIG. 4.
Figure 6B:
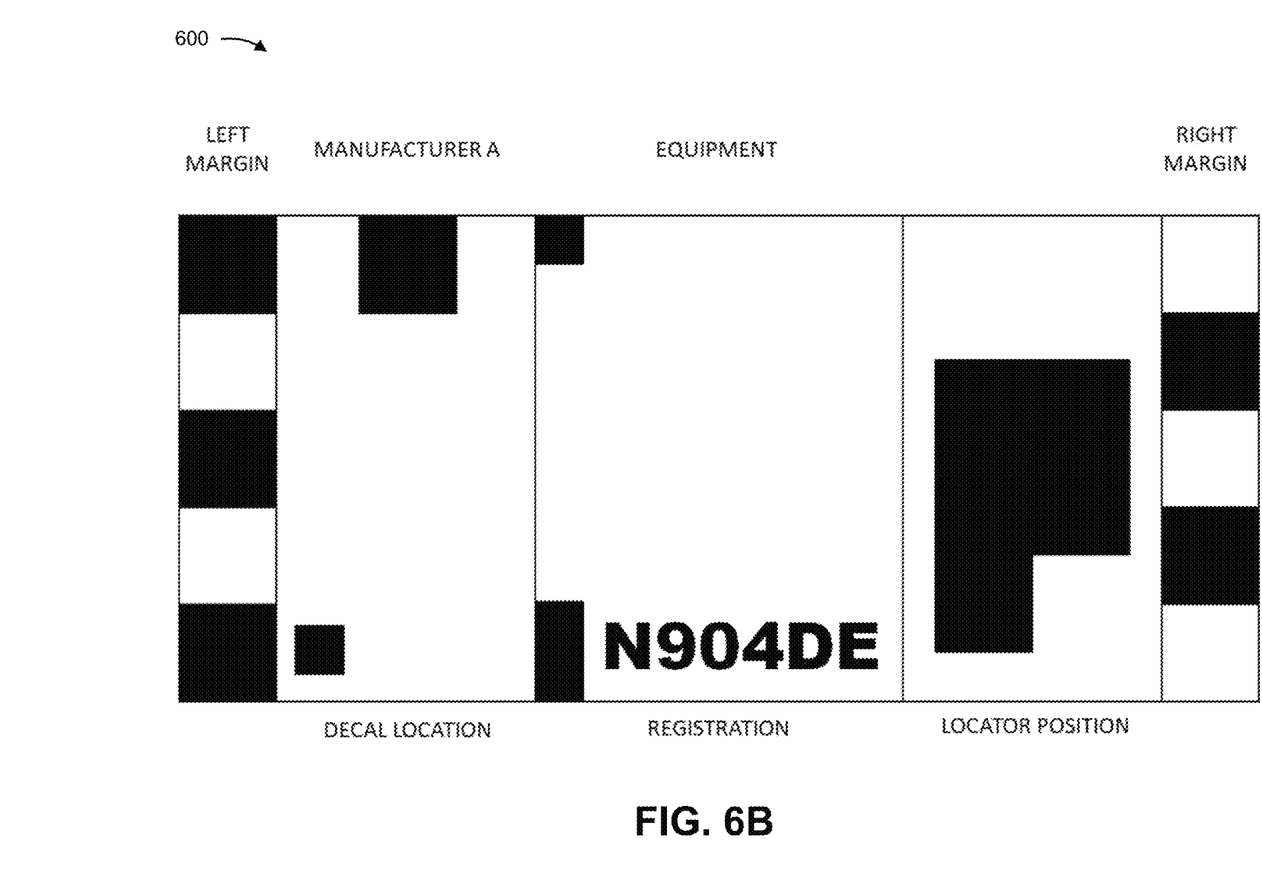
Figure 6C:
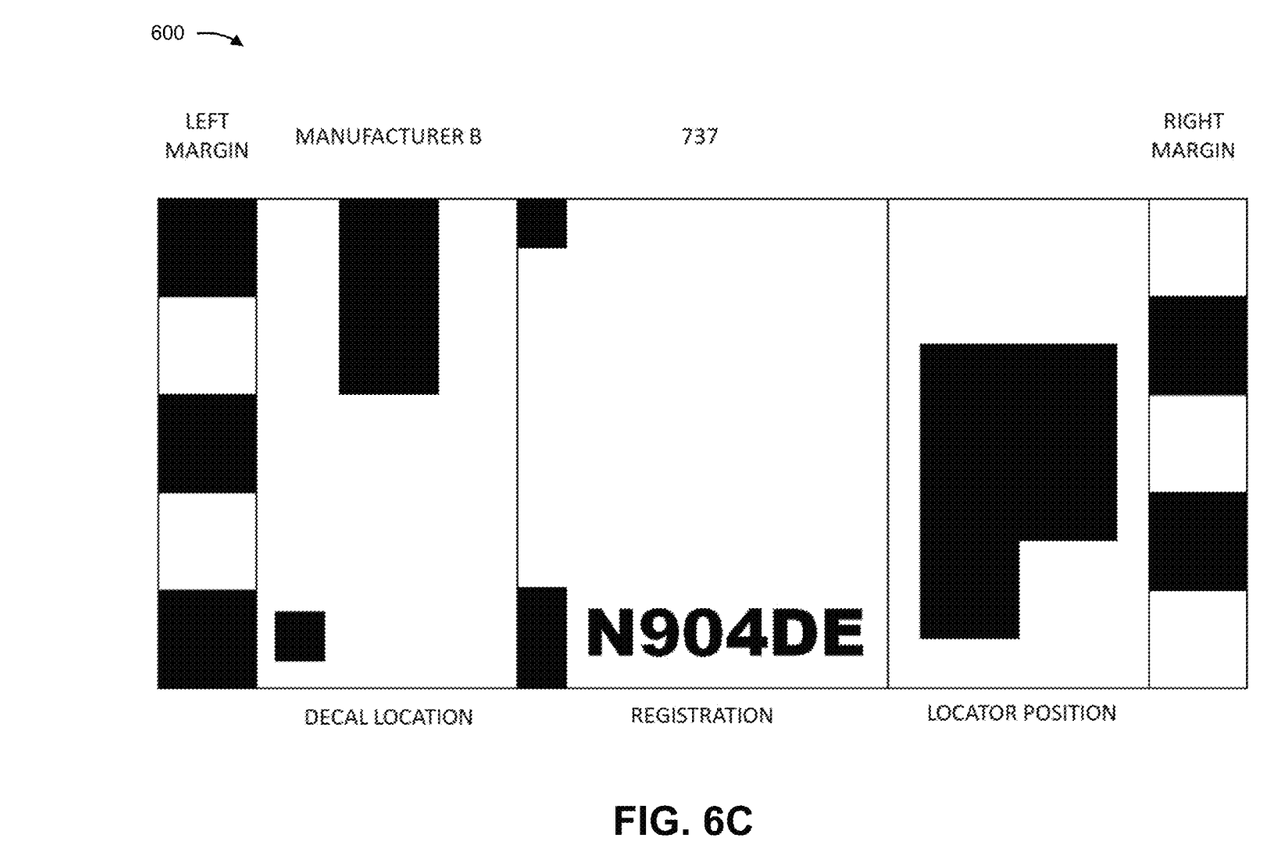
Figure 6D:
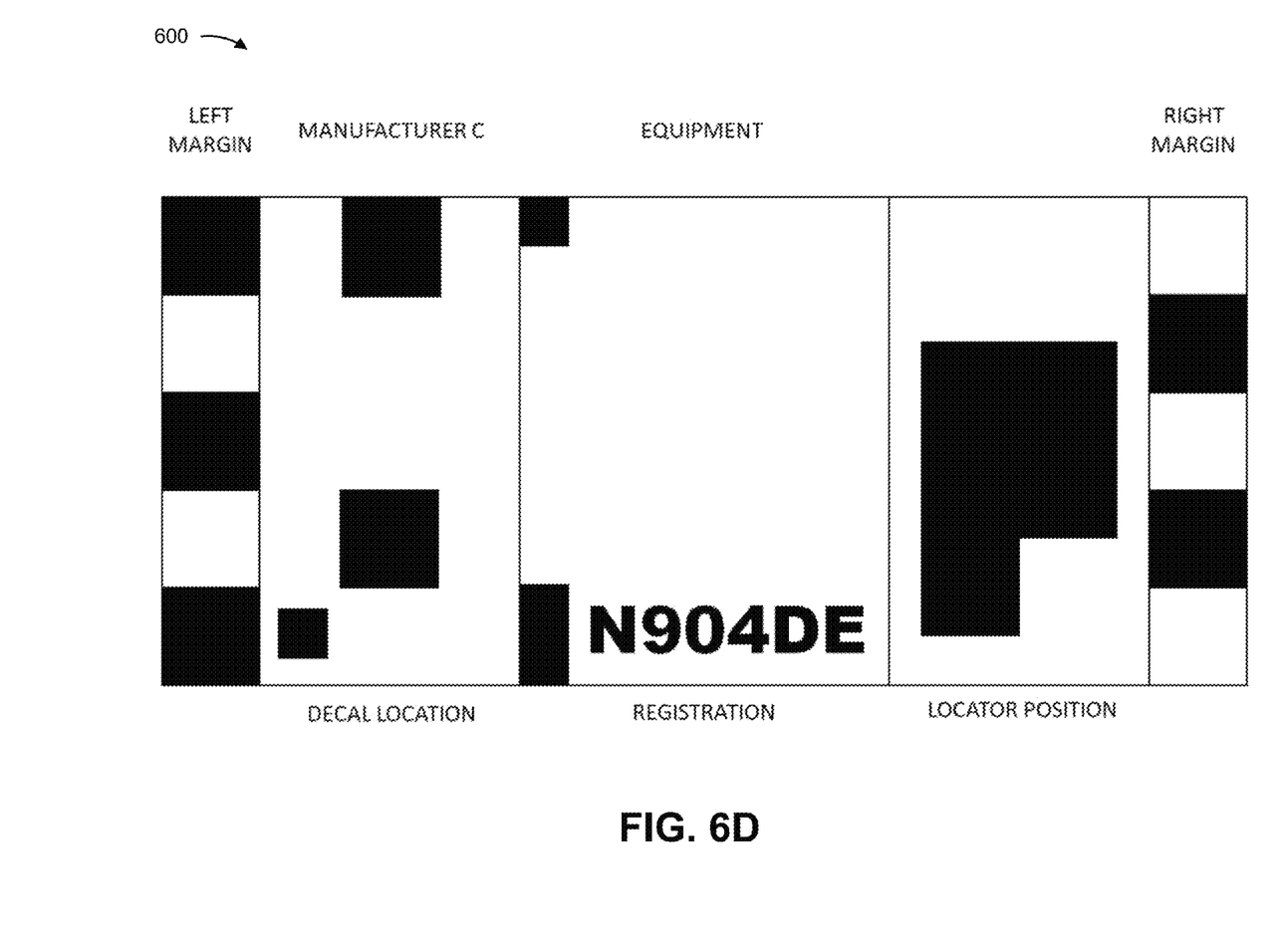

As an example, FIGS. 6A-6D show examples of encoded decals that may correspond to decal information, such as the decal information described above. In FIG. 6A, one or more encoded decals, located within the encoded area (e.g., bounded by the left margin and the right margin), may indicate a manufacturer, a type of equipment (e.g., a type of vehicle, a vehicle model, etc.), a location of the encoded decal relative to a target area (e.g., shown as "Decal Location"), registration information associated with the vehicle, and/or a location of the target area on the vehicle (e.g., shown as "Locator Position"). FIGS. 6B-6D show additional examples of using different sizes, shapes, and/or positions of encoded decals to indicate different manufacturers.

In some implementations, processing device 250 may store one or more data structures that associate encoded decal characteristics and decal information, and that associate decal information and positioning information. In this way, processing device 250 may enhance a user experience by making updates to the data structures more user-friendly via input of decal information. In some implementations, processing device 250 may store a data structure that directly associates encoded decal characteristics and positioning information. This may reduce processing time and conserve processing resources by eliminating data structure operations associated with using decal information.

As further shown in FIG. 4, process 400 may include providing one or more control signals, to automatically position the movable object relative to the surface, based on the positioning information (block 440). For example, processing device 250 may provide one or more control signals to one or more actuators 260 in a manner specified by the positioning information. As a particular example, processing device 250 may provide control signals to particular actuators 260, and/or may provide the control signals in a particular sequence, with a particular signal strength, for a particular duration of time, or the like. In this case, actuator 260 may move loading bridge 210 based on the control signals to automatically position loading bridge 210 relative to a body of a vehicle During positioning of the movable object, processing device 250 may obtain additional images (e.g., still images or video) from camera 240, may analyze the additional images, and may provide further control signals based on analyzing the images. For example, processing device 250 may determine a distance of loading bridge 210 from a target area based on a known size of an encoded decal and a size of the encoded decal observed in an image. In this case, processing device 250 may provide the control signal based on the determined distance, which may be different for different types of vehicles (e.g., the aircraft shown in FIGS. 5A and 5B). As another example, processing device 250 may determine a position relative to a target area based on a known pattern of encoded decals and a pattern of encoded decals observed in an image. In this case, processing device 250 may provide a control signal based on the determined position.

In some implementations, prior to providing control signals for automatic positioning, processing device 250 may perform a verification of the vehicle. For example, processing device 250 may compare vehicle registration information and other decal information to confirm accuracy of decal information. If there is a mismatch, or if verification otherwise fails (e.g., vehicle registration information indicates a first type of vehicle, and encoded decal characteristics indicate a second type of vehicle), then processing device 250 may prevent automatic positioning from being performed. In this case, processing device 250 may prevent control signals from being provided to actuators 260, and/or may provide an alert (e.g., via an output device, such as a display or a speaker) indicating that manual positioning of loading bridge 210 is required.

In some implementations, processing device 250 may perform verification using a database of vehicle information. In this case, processing device 250 may verify whether an identified vehicle (e.g., identified using encoded decals) is a correct vehicle for a gate, a dock, or the like. For example, the database may indicate vehicle types permitted to be connected to a particular loading bridge.

In some implementations, processing device 250 may determine whether positioning of the movable object relative to the surface is complete. For example, processing device 250 may determine whether positioning of the movable object is complete based on a distance, a position, a size of one or more encoded decals, one or more sensor readings, or the like. In some implementations, processing device 250 may output a control signal to perform an action based on determining that positioning of the movable object is complete. For example, processing device 250 may output a control signal to open a door, to start a conveyor, to provide a notification, or the like. Additionally, or alternatively, processing device 250 may output a signal (e.g., an audible signal, a visible signal, etc.) to notify a user (e.g., an operator) that positioning of the movable object is complete.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a loading bridge with a camera and a processing device that automatically aligns the loading bridge with a door of a vehicle based on one or more images captured by the camera. In this way, the possibility and/or frequency of alignment errors is reduced, thereby reducing the risk of damage to the loading bridge or to the vehicle, and/or reducing delays associated with loading or unloading the vehicle.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:

obtain, from one or more cameras, an image that depicts one or more encoded decals positioned on a body of a vehicle;
process the image;
identify, based on processing the image, one or more characteristics of the one or more encoded decals;
obtain, based on processing the image, decal information,
the decal information indicating a curvature of a surface;
determine, based on the one or more characteristics of the one or more encoded decals and the decal information, positioning information to be used to position a loading bridge relative to the body of the vehicle;
determine one or more control signals based on the positioning information; and
provide the one or more control signals to one or more actuators to automatically position the loading bridge relative to the body of the vehicle.

2. The device of claim 1, where the one or more processors are further to:
identify a door or other entryway on the body of the vehicle based on the one or more encoded decals; and
where the one or more processors, when providing the one or more control signals, are to:
provide the one or more control signals to automatically position the loading bridge relative to the door or other entryway.

3. The device of claim 1, where the one or more characteristics of the one or more encoded decals include at least one of:
one or more shapes of the one or more encoded decals,
one or more orientations of the one or more encoded decals,
a position of a first encoded decal, of the one or more encoded decals, relative to a second encoded decal of the one or more encoded decals,
one or more colors of the one or more encoded decals,
one or more sizes of the one or more encoded decals,
a pattern formed by the one or more encoded decals, or
a quantity of the one or more encoded decals.

4. The device of claim 1, where the positioning information identifies the one or more actuators to which the one or more control signals are to be provided.

5. The device of claim 1, where the positioning information identifies one or more types of the one or more control signals to be provided to the one or more actuators.

6. The device of claim 1, where the one or more processors are further to:
obtain an additional image after providing at least one control signal, of the one or more control signals, to the one or more actuators;
process the additional image;
identify, based on processing the additional image, one or more additional control signals to be provided; and
provide the one or more additional control signals.

7. The device of claim 1, where the one or more processors are further to:
determine that positioning of the loading bridge relative to the body of the vehicle is complete; and
output a signal based on determining that positioning of the loading bridge relative to the body of the vehicle is complete.

8. A method, comprising:
receiving, by a device, one or more images that depict one or more encoded decals positioned on a surface;
processing, by the device, the one or more images;
identifying, by the device and based on processing the one or more images, one or more characteristics of the one or more encoded decals;
obtaining, by the device and based on processing the image, decal information,
the decal information indicating a curvature of the surface;
determining, by the device and based on the one or more characteristics of the one or more encoded decals and the decal information, positioning information to be used to position a movable object relative to the surface;
determining, by the device, one or more control signals based on the positioning information; and
providing, by the device, the one or more control signals to one or more actuators to automatically position the movable object relative to the surface.

9. The method of claim 8, where the surface is a body of a vehicle.

10. The method of claim 9, further comprising:
identifying a door or other entryway of the vehicle based on the one or more encoded decals; and
where providing the one or more control signals comprises:
providing the one or more control signals to automatically position the movable object relative to the door of the vehicle.

11. The method of claim 9, further comprising:
identifying the decal information based on the one or more characteristics,
the decal information including information regarding the vehicle.

12. The method of claim 11, where the decal information further indicates at least one of:
a size of a door or entryway of the vehicle,
a position of the door or entryway of the vehicle, or
dimensions of the door or entryway of the vehicle.

13. The method of claim 8, where the one or more characteristics of the one or more encoded decals include one or more shapes of the one or more encoded decals or human readable characters of the one or more encoded decals.

14. The method of claim 8, where the one or more characteristics of the one or more encoded decals include at least one of:
a position of a first encoded decal, of the one or more encoded decals, relative to a position of a second encoded decal of the one or more encoded decals, or
a pattern formed by multiple encoded decals included in the one or more encoded decals.

15. A non-transitory computer-readable medium storing instructions, the instructions comprising:
one or more instructions that, when executed by one or more processors, cause the one or more processors to:
identify one or more encoded decals included in an image,
the one or more encoded decals being positioned on a surface;
identify one or more characteristics of the one or more encoded decals;
obtain, based on identifying the one or more encoded decals, decal information,
the decal information indicating a curvature of the surface;
determine, based on the one or more characteristics of the one or more encoded decals and based on the decal information, positioning information to be used to position a movable object relative to the surface;

determine one or more control signals, to be provided to one or more actuators, based on the positioning information; and provide the one or more control signals to the one or more actuators to position the movable object relative to the surface.

16. The non-transitory computer-readable medium of claim 15, where the movable object is a loading bridge; and where the surface is a body of a vehicle.

17. The non-transitory computer-readable medium of claim 15, where the one or more instructions, when executed by the one or more processors, cause the one or more processors to:

identify a target area of the surface based on the one or more characteristics of the one or more encoded decals; and where the one or more instructions, that cause the one or more processors to provide the one or more control signals, cause the one or more processors to:

provide the one or more control signals to the one or more actuators to position the movable object relative to the target area.

18. The non-transitory computer-readable medium of claim 17, where the target area includes a door or an opening of an aircraft.

19. The non-transitory computer-readable medium of claim 15, where the positioning information identifies a sequence of multiple control signals to be provided to the one or more actuators; and where the one or more instructions, that cause the one or more processors to provide the one or more control signals, cause the one or more processors to:

provide the multiple control signals according to the sequence.

20. The non-transitory computer-readable medium of claim 15, where the positioning information identifies a duration of time for which the one or more control signals are to be provided to the one or more actuators; and where the one or more instructions, that cause the one or more processors to provide the one or more control signals, cause the one or more processors to:

provide the one or more control signals for the duration of time.

* * * * *